May 7, 1929. H. A. WEBSTER 1,711,913
APPARATUS FOR PRODUCING SYNTHETIC HYDROCARBONS AND ALCOHOLS
Filed Oct. 1, 1926
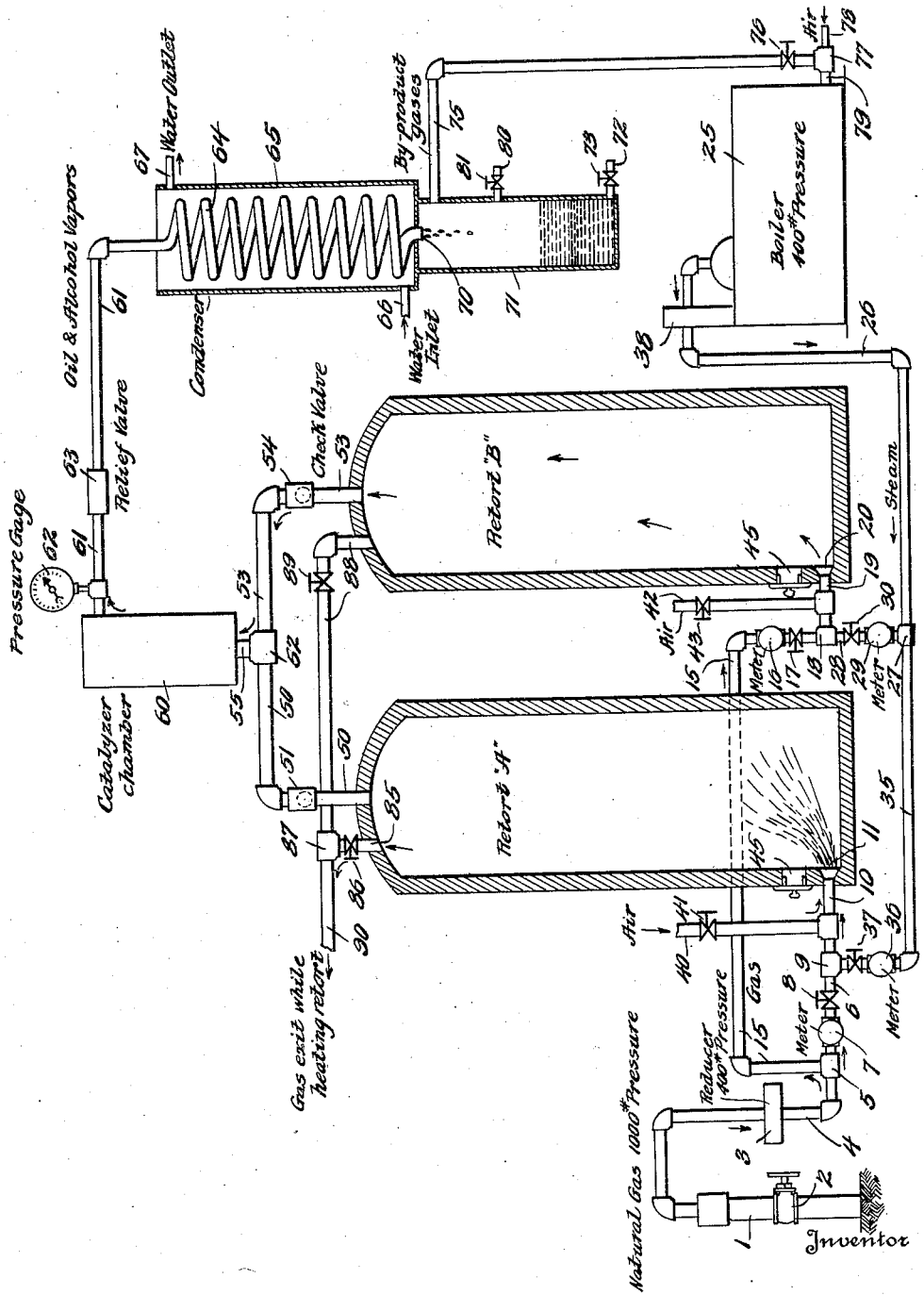
H. A. Webster,
Inventor
By
Attorney Patented May 7, 1929.

1,711,913

UNITED STATES PATENT OFFICE.

HYLEMAN A. WEBSTER, OF COLUMBIA, TENNESSEE, ASSIGNOR OF ONE-HALF TO EVERET T. SCHULER, OF GADSDEN, ALABAMA.

APPARATUS FOR PRODUCING SYNTHETIC HYDROCARBONS AND ALCOHOLS.

Application filed October 1, 1926. Serial No. 138,906.

This invention relates to the production of synthetic hydrocarbons and alcohol and has for its object to provide a process of and an apparatus for said production which is less costly and more efficient than those heretofore proposed.

With these and other objects in view the invention consists in the novel steps and combinations of steps constituting the process, as well as in the novel details of construction and combinations of parts constituting the apparatus, all as will be more fully disclosed hereinafter and particularly pointed out in the claims.

This application constitutes a continuation in part of my copending application Serial No. 136,004 filed September 16, 1926, and entitled Process for producing synthetic hydrocarbons and alcohol.

The accompanying drawing illustrates an efficient apparatus for carrying out this process in which natural gas, utilized just as it comes from the well, is heated in a retort in combination with steam to decompose the same into carbon monoxide and nascent hydrogen, as represented by the equation

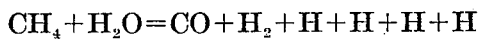

$$CH_4 + H_2O = CO + H_2 + H + H + H + H$$

and the new formed gases are then passed under relatively high pressure into a catalyzer chamber where a reaction occurs to form alcohol and water vapors, taking the oxygen, and to form the hydrocarbon vapor, taking the carbon and hydrogen elements remaining. The alcohol and hydrocarbons are subsequently recovered as condensates and submitted to such further refining processes as desired.

In this process the natural gas under approximately 1,000 pounds pressure leaves the well as through the pipe 1 controlled as by the valve 2 and passes into and through a suitable reducer 3 where the pressure of the gas is lowered to approximately 400 pounds to the square inch. The gas under the reduced pressure is then conducted as by the conduit 4 to a divisional point 5 therein, where part of the gas is conducted as through a conduit 6, supplied with a suitable meter 7 and cut-off valve 8, to a T 9 and thence through the conduit 10 to the retort "A", entering the same preferably at the bottom as at 11.

From the division point 5 the other portion of the gas is conducted through a branch conduit 15, provided with a suitable meter 16 and cut-off valve 17 similar to the meter 7 and cut-off valve 8, to a T connection 18 and thence through the conduit 19 to retort "B" where it enters preferably at the bottom as indicated at 20. Thus it will be seen that the gas, under a pressure of 400 pounds per square inch, can be admitted to either or both of the retorts and further that the meters 7 and 16 will register the flow of the gas into said retorts, while the valves 8 and 17 control said flow.

The steam is generated in the boiler generally indicated by the numeral 25 to a pressure of substantially 400 pounds, or to the same pressure as the gas entering the retorts. The steam passes from the boiler 25 through the conduit 26 to the divisional point 27 where part of the steam passes through the conduit 28, supplied with a suitable meter 29 and a cut-off valve 30, to the T 18, where said steam meets the gas, and the combined gas and steam will pass through the conduit 19 into retort "B". The other portion of the steam supply from the divisional point 27 passes through a conduit 35, provided with a suitable meter 36 and a cut-off valve 37, to the T 9 where it joins the gas from the conduit 6, and the combined gas and steam will pass through the conduit 10 into retort "A". In this respect the two retorts "A" and "B" are substantially duplicates or are as near duplicates as construction will permit. The boiler 25 is provided with a suitable stack 38 to conduct away the gases of combustion formed in generating the steam.

An air pipe 40, provided with a cut-off valve 41, is joined to the conduit 10 in order that air may be admitted together with the gas to retort "A", and a second air pipe 42, provided with a cut-off valve 43, connects with the conduit 19 to admit air with the gas to retort "B". Each retort may be provided with a hand-hole, such as indicated at 45, provided with a suitable gas tight cover for a purpose presently to appear, said hand holes being disposed adjacent the inlet nozzles 11 and 20 through which the gas enters said retorts.

Retort "A" preferably at its central upper portion is provided with an exit pipe 50, provided with a check valve 51, which leads to a T 52 to which is connected an exit pipe 53, provided with a suitable check valve 54, communicating with the upper central portion of the retort "B". Thus it will be seen that gases from retort "A" or retort "B" can reach the T 52 and pass therefrom as through the connection 55 into one end of a catalyzer chamber 60. At the opposite end of the catalyzer chamber there leads a conduit 61 provided with a suitable pressure gauge 62 and a relief valve 63 preset for a pressure of substantially 400 pounds per square inch. This conduit 61 leads to a suitable coil construction 64 disposed in a condenser tank 65 to which water is admitted at the bottom as through the inlet pipe 66 and from which the cooling water may escape as through the pipe 67 at the top of said tank. The gases are condensed in the coil 64 and the condensate allowed to drip from the lower end 70 of said coil into a receiving tank 71 provided at its bottom with a pipe connection 72, controlled as by the valve 73, through which the condensate may be withdrawn from the tank. Should any uncondensed vapors reach the tank 71, they may escape therefrom through the conduit 75 and be disposed of in any suitable manner. In the drawing it will be observed that the conduit 75, for these by-product gases, is provided with a cut off valve 76 and leads to a T 77 in which said gases may be admixed with air, entering as through the conduit 78, and the combined gases and air passed under the boiler as through the connection 79 where they may be burned, thus aiding in the production of the steam for carrying out this process. It is to be understood, however, that the by-product gases may be led elsewhere and either recovered or disposed of, as desired.

The retort "A" is also provided at its top with a second conduit 85, provided with a cut off valve 86, leading to a T 87 to which is connected a similar conduit 88, provided with a cut off valve 89, leading to the top of retort "B". Any gases in either conduit 85 or 88 may escape by passing through the conduit 90 leading from the T 87.

In operation, gas from the well passes through the conduit 6 due to the valve 8 being open and thence through the conduit 10 into retort "A" as at 11, and air is admitted, through the valve 41 in the conduit 40, to the conduit 10 to mix with the gas entering said retort. The valves 17, 30 and 37 controlling the steam supply to both retorts as well as the gas supply to retort "B" are closed during this operation. The mixture of gas and air is ignited in any suitable manner within the retort "A", and for this purpose the hand-hole 45 may be utilized. The burning gas in retort "A" will heat said retort, and the gases of combustion will escape through the conduits 85 and 90 as will be readily understood, the valve 86 being open, and the valve 89 being closed.

When the temperature in retort "A" has been raised to substantially 2,300° F., the air valve 41 is closed, air valve 43 is opened and gas can be admitted into retort "B" and the mixture of gas and air ignited therein in any suitable way, such as through the hand-hole 45, in order to heat retort "B". At the same time, the valve 89 is opened and the valve 86 is closed so that the gases of combustion in retort "B" may escape therefrom through the conduits 88 and 90. While retort "B" is being heated, valve 37 is opened so that steam may enter retort "A" together with gas and the temperature of the mixture raised due to the preheated condition of said retort, whereupon the methane ($CH_4$) and the steam ($H_2O$) are decomposed to form carbon monoxide and nascent hydrogen. These new formed gases then pass from retort "A" through the conduit 50 controlled by the check valve 51, into the catalyzer chamber 60, but are prevented from entering retort "B" by the check valve 54 disposed in the conduit 53 communicating with said last named retort.

The chamber 60 contains a suitable catalyzer such as a metal calcined with a base, or a salt having a strong base and a weak acid. It has been found that the most active catalyzer is iron and potash, but good results have been obtained from the use of other metals such as nickel, cobalt or manganese calcined with other bases or salts having a strong base and a weak acid, such for example as caustic lime or caustic soda, or carbonates of soda or lime. In the presence of such a catalyzer the carbon monoxide and the nascent hydrogen are combined to form alcohol and water vapors, taking the oxygen, and to form the hydrocarbon vapors, taking the carbon and hydrogen elements remaining, but the temperatures of the carbon monoxide and hydrogen must not exceed 475° C. nor fall below 325° C. during their passage under pressure from the retort to and through the catalyzer chamber. This is due to the endothermic reaction taking place in the retort to form the carbon monoxide and nascent hydrogen and therefore the temperature of the gases leaving the retort must be watched and maintained between 325° and 475° thus making it necessary at times to cool the gases beyond the temperature produced by the endothermic reaction. It will be understood that the alcohol and hydrocarbons formed by the catalyzer are in the vapor state under high pressure (substantially 400 pounds), due to the relatively high temperature within, and as they pass from, said catalyzer chamber.

The vapors from the catalyzer chamber 60 are then conducted through the relief valve 63 in the conduit 61 to a coil submerged in cooling water in order to effect the condensation of said vapors, and the condensates are collected in the receiving tank 71 from which they may be withdrawn, as by means of the valved connection 72, and treated as desired.

While the production of the alcohol and hydrocarbon vapors emanating from the retort "A" has been taking place, retort "B" has been heating up due to the burning gas therein. When the temperature of retort "B" has reached 2,300° F., then the air valve 43 is closed and the steam valve 30 opened so that a mixture of natural gas and steam may be admitted to said retort for an endothermic reaction therein, as disclosed above for retort "A", to produce carbon monoxide and nascent hydrogen. At the same time that the air valve 43 is closed, the valve 89 is also closed, so that the reaction gases in retort "B" may escape through the conduit 53 and reach the catalyzer chamber 60. When the gas and steam are admitted to retort "B", the temperature of retort "A" will have become reduced to a point requiring another heating and therefore the steam valve 37 is closed and the air valve 41 is opened to permit a mixture of gas and air only to enter retort "A" where it may be ignited for the purpose of producing heat as above described. Thus it will be seen that the two retorts are alternately heated and subsequently utilized as a chamber for producing carbon monoxide and nascent hydrogen. That is to say, while one retort is being heated, the other retort is functioning to produce the required gases and then when the temperature of the last named retort falls to a degree insufficient to insure the required reaction, it is heated and the retort which was meantime heating is utilized to produce the reaction gases.

An important feature of this invention is the metering of the steam and natural gas and therefore the meters as shown are very essential. In this connection 16 parts by weight of natural gas are admixed with 18 parts by weight of steam to produce the required mixture which will permit the reaction under heat and pressure to create the carbon monoxide and hydrogen. It is further to be observed that the pressure of 400 pounds per square inch is substantially maintained throughout the apparatus, or in other words, natural gas under this pressure is mixed with steam under the same pressure and a relief valve 63 is interposed in the condenser line to maintain the said pressure in the retort and the catalyzer chamber.

Another important feature is the pressure utilized. That is to say, it has heretofore been necessary to provide a pressure of approximately 2,250 pounds to decompose methane, whereas according to this invention a pressure of only 350 pounds per square inch has produced the best results. Other pressures however may be used, or in other words, it is to be understood that under this procedure a pressure of less than 350 pounds or a pressure of more than 350 pounds may be utilized with productive results, but it will be evident that a higher pressure is useless inasmuch as it causes a needless expenditure without increasing the production.

Another important feature of this invention is the nascency of the hydrogen. In other words, it has been definitely ascertained by this invention that the combination of carbon monoxide and hydrogen, separately produced and heated in the presence of such a catalyst as herein disclosed, will not produce the alcohol and hydrocarbon vapors at pressures lower than 2,250 pounds per square inch. However, by maintaining the temperatures above disclosed in the retort and by employing steam admixed with natural gas under a pressure of not exceeding 400 pounds to the square inch, the mixture is decomposed to produce carbon monoxide and nascent hydrogen. The nascency of the hydrogen produced is maintained during its passage to and into the catalyzer chamber 60 as must be evident because alcohol and hydrocarbon vapors are produced by this process whereas they are not produced by the action of carbon monoxide and hydrogen which is not nascent except at extremely high pressures. This invention has been carried out on a commercial scale, and is not merely a laboratory experiment and therefore the nascency of the hydrogen has been established beyond a doubt. The hydrogen in this highly active state of nascency reacts at considerably lower pressures than ordinary hydrogen and therefore it is possible to utilize a pressure of less than 400 pounds per square inch to attain the results desired.

Another important feature of this invention is the continuity of the process. That is to say, the flow of gas is divided, one portion being used to heat a retort while the other portion is undergoing decomposition in the other retort, suitable valves being provided so that the retorts can be alternately heated without stopping the formation of the carbon monoxide and the hydrogen. It is to be observed that in this process there is no loss of the raw material, or in other words, whatever gas is not burned for heating one retort is decomposed in the other retort.

A still further and important feature of this invention is the extreme cheapness of production. That is to say, an apparatus of this character can be installed at and connected to a natural gas well so that the raw material can be obtained at the cheapest possible cost. Further, natural gas issues from the earth at a very high pressure or in the neighborhood of 1,000 pounds per square inch which is more than sufficient to produce the maximum of 400 pounds pressure of this process. Therefore no expensive pumps, which are also costly to operate, are necessary to force the gas through the apparatus. The water from which the steam is generated likewise is a cheap material and therefore, outside of the first installation costs, practically the only remaining costs incident to this process are those of fuel to change the water into steam and substantially negligible maintenance and replacement costs.

Therefore the advantages flowing from the use of this process and apparatus are obvious but may be summarized as residing in a great reduction of production costs, continuity of process by the natural pressure of the raw material, and the ability to utilize a natural resource in such a manner as to make it a marketable product capable of shipment to distant points. In other words, natural gas heretofore has not been transmitted any appreciable distance and therefore there has been a great waste of this natural resource, but by this invention the gas, not utilized locally for present purposes, can be changed into commodities capable of easy transportation to distant points thereby benefiting, to an immense degree, the public at large.

Thus it will be seen that there is provided by this invention an improved process for continually transforming natural gas as it comes from the well into hydrocarbons and alcohol which consists in utilizing the pressure of the gas to subject a portion of the gas with steam to a temperature, produced by the burning of the other portion of said gas, sufficient to decompose the gas and steam into carbon monoxide and nascent hydrogen. This heating is done in a retort by endothermic reaction, the retort having been previously heated by burning therein a mixture of gas and air. The carbon monoxide and nascent hydrogen thus produced is then subjected to the action of a catalyst and the vapors, formed by this reaction under the influence of pressure and temperature, condensed. The natural gas is utilized to effect the passage of the gas through the apparatus, and it should be observed that this pressure is not fixed. That is to say, a pressure of 350 pounds per square inch has been found ideal for producing these results but pressures above and below this amount are also productive.

It is obvious that those skilled in the art may vary the details of construction as well as the arrangements of parts, and also may vary the steps constituting this process, without departing from the spirit of the invention and therefore it is not desired to be limited to the above disclosure except as may be demanded by the claims.

What is claimed is:—

1. In an apparatus for producing hydrocarbons and alcohol from natural gas the combination of a retort for decomposing said gas by heating; means for supplying a portion of said gas to said retort; a second retort adapted to be heated by the other portion of said gas; means for supplying the other portion of said gas to said second retort; means to supply steam alternately to said retorts; means to supply air alternately to said retorts and alternately with said steam supply; catalyzing means communicating with said retorts; and means for conducting gas from said retorts to, through, and away from said catalyzing means.

2. In an apparatus for producing hydrocarbons and alcohol from natural gas the combination of a retort for decomposing gas by heating; means for supplying a portion of said gas to said retort; a second retort adapted to be heated by the other portion of said gas; means for supplying the other portion of said gas to said second retort; means to supply steam alternately to said retorts; means to supply air alternately to said retorts and alternately with said steam supply; catalyzing means communicating with said retorts; means for conducting gas from said retorts to, through, and away from said catalyzing means; and means for by-passing gas from said retorts away from said catalyzing means, when desired.

3. In an apparatus for producing hydrocarbons and alcohol from natural gas the combination of a retort for decomposing said gas by heating; means for supplying a portion of said gas to said retort; a second retort adapted to be heated by the other portion of said gas; means for supplying the other portion of said gas to said second retort; means to supply steam alternately to said retorts; means to supply air alternately to said retorts and alternately with said steam supply; a single catalyzing chamber common to both said retorts; and means for conducting gas from said retorts alternately to, through, and away from said catalyzing chamber.

4. In an apparatus for producing hydrocarbons and alcohol from natural gas the combination of a retort for decomposing said gas by heating; means for supplying a portion of said gas to said retort; a second retort adapted to be heated by the other portion of said gas; means for supplying the other portion of said gas to said second retort; means to supply steam alternately to said retorts; means to supply air alternately to said retorts and alternately with said steam supply; a single catalyzing chamber common to both said retorts; means for conducting gas from said retorts alternately to, through, and away from said catalyzing chamber; and means for alternately by-passing gas from said retorts away from said catalyzing chamber.

In testimony whereof I affix my signature.

HYLEMAN A. WEBSTER.